Patented Oct. 12, 1954

2,691,614

UNITED STATES PATENT OFFICE 2,691,614

ADHESIVE COMPOSITION AND ARTICLE CONTAINING SAID ADHESIVE AND METHODS FOR MAKING THE SAME

Matthew W. Wilson, Stow, Ohio, assignor to The B. F. Goodrich Company, New York, N. Y., a corporation of New York No Drawing. Application September 3, 1953, Serial No. 378,401

20 Claims. (Cl. 154—139)

This invention relates to the method of adhering fibrous material to rubber material and the composite structure obtained thereby, and is particularly concerned with adhering fibrous material to rubber material with a heat-hardening adhesive composition comprising a rubber latex and a fusible curable resin prepared as set forth hereinafter. This application is a continuation-in-part application of my prior copending application Serial No. 46,551, filed August 27, 1948, now abandoned.

Many rubbery articles comprise rubber material having fibrous material as reinforcement therefor. The fiber reinforcement usually is incorporated into a body of rubbery material, before vulcanization, in the form of textile cord or fabric. It is necessary in preparing an article such as a tire or belt, to provide means for adhering the fibrous material to the body of rubber material to prevent separation of the fiber and the rubber in service with a resultant premature failure of the article. Various adhesive compositions have been proposed and used for obtaining adhesion of fiber to rubber and one of the most efficacious compositions has been one comprising, broadly, a rubber latex and a thermosetting phenol-aldehyde resin as set forth by Charch and Maney in U. S. Patent No. 2,128,229, issued August 30, 1947, or as modified by Compton and Wilson in U. S. Patent No. 2,429,397, issued October 21, 1947.

It is an object of this invention to secure improved adhesion of filamentary material to rubber material by means of an adhesive composition comprising a rubber latex and a phenol-aldehyde resin.

I have discovered that greatly improved adhesion of filamentary material to rubber is obtained when the adhesive composition used to coat the filamentary material comprises an aqueous dispersion of polymeric organic rubber material and a resin prepared by condensing a phenol and an aldehyde in such manner as to yield an essentially linear resin, which linear resin is thereafter converted at least in part to a cross-linked resin. More particularly, the resin which is used in accordance with this invention for obtaining improved adhesion is the fusible curable resin prepared by condensing substantially equimolar proportions of a phenol with an aldehyde in the presence of an acidic catalyst to yield a resin composed of essentially linear molecules and thereafter dissolving the linear resin molecules in an aqueous solution of base and further condensing the linear molecules to a cross-linked molecular structure, preferably by adding a material adapted to furnish methylene groups, such as formaldehyde, to the resin in the basic solution.

A composite structure having improved adhesion between the filamentary reinforcement and a body of rubber material is prepared by coating the filamentary material with the adhesive composition including a phenol-aldehyde resin in accordance with this invention, drying the treated filamentary material, incorporating the treated filamentary material in a vulcanizable rubber material and thereafter heating the assembled structure to vulcanize the rubbery component and thermoset the resin.

The filamentary material treated may be any of the naturally-occurring or synthetic filaments and may be in the form of yarn, cord or fabric. The filamentary material will include the naturally-occurring fibers such as cotton, silk, ramie and the various bast fibers and the like; the synthetic fibers such as the fibers of any of the synthetic fiber-forming organic materials such as rayon, that is, the regenerated cellulosic materials whether prepared by the viscose, cuprammonium or other process; nylon, by which is meant synthetic linear superpolyamides, such as polyhexamethylene adipamide; and other synthetic fibers; as well as filamentary materials prepared from glass, metal and other materials.

The rubber material to which the filamentary material is adhered may be any vulcanizable polymeric organic rubbery material, whether crude or synthetic, with either crude rubber or the rubbery butadiene copolymers being preferably employed. The crude rubber employed may be any of the naturally-occurring rubber materials including, for example, caoutchouc, balata, gutta percha and the like. Likewise, any of the various synthetic rubbers may be used including polymers of butadiene-1,3, isoprene, 2-chlorobutadiene-1,3, isobutylene, and the like, as well as interpolymers of these and similar materials with each other or with such interpolymerizable monomers as styrene, acrylonitrile, methacrylonitrile, methyl methacrylate, ethyl methacrylate, 2-vinyl pyridine, and similar monomeric materials. The rubber material may also include mixtures of any of the above materials with each other or with reclaimed crude or synthetic rubber or other vulcanizable rubber materials. The rubber materials may also include any of the well-known compounding ingredients for rubber in the amounts and proportions in accordance with conventional compounding technique.

The reason why an adhesive composition including a phenol-aldehyde resin which is prepared first as an essentially linear molecular resin and then at least partially converted to a cross-linked molecular structure exhibits increased adhesion to filamentary material and rubber material is not understood and the scope of the invention will not be limited by any theory which might be offered by way of explanation.

The resin may be any of the fusible curable condensation resins prepared by condensing substantially equimolar proportions of a phenol with an aldehyde in the presence of an acidic catalyst to yield a resin having an essentially linear molecular structure which is substantially free of cross-linkage and which is thereafter converted to a cross-linked molecular structure.

The phenol may be any of the members of the aromatic hydroxyl series consisting solely of carbon, hydrogen and hydroxyl oxygen, and the term "a phenol" is used in the generic sense to include any of these materials. Thus, the phenols may include any of the monohydric phenols such as phenol, cresol or xylenol and the like but is preferably one of the water-soluble polyhydric phenols having hydroxyl groups in meta relationship such as resorcinol, phloroglucinol, orcinol, cresorcinol and m-xylorcinol although other polyhydric and monohydric phenols may be used.

The phenol may be condensed with any aldehyde which will condense therewith to yield a thermosetting resinous condensation product and the aldehydes which are free of phenyl groups and consist solely of carbon, hydrogen and aldehyde oxygen are particularly suitable, including such materials as furfural and acrolein, although the aliphatic aldehydes having less than six carbon atoms are preferably used such as formaldehyde, acetaldehyde and butyraldehyde.

In order to obtain an essentially linear resin structure, substantially equimolar proportions (i. e., 1:0.7 mole to 1:1 mole) of a phenol and an aldehyde are condensed by refluxing a mixture of these components in the presence of an acidic condensation catalyst. Any of the well-known acidic condensation catalysts may be employed, with the ionizable inorganic or organic acids being preferably used. Of these acids, oxalic acid and the benzene sulfonic acids are particularly suitable for ease in controlling the condensation reaction. The acid catalyst may be used in varying amounts depending upon the reaction time desired; 0.05% to 5.0% by weight based on the weight of the phenolic constituent being desirably used.

The condensation reaction is carried out in a water-miscible volatile organic solvent since the resinification may be accomplished by refluxing in a very short time, the reaction generally being complete in 15 to 60 minutes of heating under reflux. Any of the water-miscible volatile organic solvents may be used which do not readily coagulate latex. The amount of solvent used may vary widely, with the minimum amount being dependent upon the solubility of the resin therein and the maximum amount being determined by its coagulative effect on latex. Generally, the solvent is used in an amount of 30% to 150% by weight based on the combined weight of the phenolic and aldehyde reactants. Of the solvents, acetone is preferably used, although the water-miscible alcohols such as ethyl alcohol, methyl alcohol, glycerin and the like; ketones, such as methyl ethyl ketone and the like; and similar well-known water-miscible solvents may be used.

The resins prepared in this manner by the acid-catalyzed condensation of substantially equimolar proportions of a phenol and an aldehyde have an essentially linear molecular structure substantially free of cross-linking. This resin in solution in the water-miscible solvent is then dissolved in an aqueous solution of base, which may be sodium or potassium hydroxide or a primary or secondary amine or the like but preferably is ammonium hydroxide. When sodium or potassium hydroxide is employed, a minimum amount should be used to prevent a deleterious effect on the adhesion of the final composition. The maximum amount of such alkali metal hydroxide preferably should not exceed 0.1% of the weight of the final adhesive composition or about 2% by weight based on the weight of the resin, although 1.0% to 5.0% or greater may be used based on the weight of the resin, in which case the excess base may be neutralized before the adhesive composition is used. The amount of ammonia or amine used is not critical and may be varied within wide limits. For practical purposes a 28% by weight aqueous solution of ammonia is used in an amount of 5% to 20% of the total weight of the adhesive composition.

The resulting basic resin solution is thereupon treated to convert the acid-catalyzed resin to a cross-linked structure, preferably after the resin solution is mixed with a vulcanizable rubber latex. The resin may be mixed with any of the well-known aqueous dispersions of vulcanizable polymeric organic rubber material. Thus, any vulcanizable rubber latex, whether crude or synthetic, may be used including caoutchouc latex or synthetic latices such as latices prepared by the polymerization of butadiene, isoprene, chloroprene, isobutylene and similar ethylenic monomers or interpolymers of these or similar monomers with each other or with such copolymerizable monomers as styrene, acrylonitrile, methacrylonitrile, methyl methacrylate, ethyl acrylate, 2-vinyl pyridine, 3-vinyl pyridine, 4,6-dimethyl 2-vinyl pyridine and similar well-known monomers. Of such latices, the butadiene copolymeric latices are preferably employed.

The rubber latex may contain, in addition to the rubber, any of the well-known compounding ingredients for latex such as vulcanizing agents and accelerators therefor, anti-oxidants, fillers, reinforcing agents, emulsifiers, stabilizers, modifiers, etc., in amounts and proportions in accordance with conventional compounding techniques. The amount of latex is chosen so that the resin-to-rubber ratio in the final adhesive composition is from 1:6 to 1:2 parts by weight.

The acid catalyzed resin in this basic solution is thereafter at least partially converted to a cross-linked structure by the addition to the resin solution of a material which is capable of furnishing active methylene groups. Such material may be hexamethylene tetramine or similar readily dissociable material but is preferably an aldehyde such as furfural or acrolein or particularly formaldehyde which may be added as formalin (37% to 40% by weight aqueous solution of formaldehyde). The amount of such material which is added will vary depending upon the type of fiber to be coated, per cent of resin in the adhesive composition, etc. but sufficient such material should be added so that the aldehyde-to-phenol ratio is greater than 1:1. The amount of formaldehyde necessary usually amounts to 1% to 5% of the total weight of the final adhesive composition including water, although as much as 10% by weight may be added in some cases. This additional formaldehyde in basic solution serves to convert the resin from an essentially linear molecular structure to a cross-linked structure, at least in part. The base catalyzed conversion of the resin proceeds almost instantaneously at room temperature, but the adhesive preferably is allowed to stand for at least an hour at room temperature after the addition of the formaldehyde to the basic solution.

The final adhesive composition may contain from 5% to 40% by weight of rubber solids, with a composition containing 8% to 20% by weight of rubber solids being preferably employed. The amount of phenolic resin in the composition may vary widely but, in general, the resin amounts to 0.5% to 20% of the total composition weight and preferably from 0.8% to 10% of the total weight.

The filamentary material may be treated with the adhesive composition by immersing the yarn, cord or fabric therein, by spraying or spreading the adhesive composition thereon or by any similar well-known method. In the case of fibrous material, the fiber is preferably coated by immersing the fiber in the adhesive composition for a time sufficient to obtain a penetration of the rubber latex into the fibrous material to a depth of 2 to 4 fiber diameters. In the case of tire cord, it is usually sufficient to immerse the cord for 2 to 4 seconds although in the case of some fibrous materials, an immersion time of as much as a minute may be used. The immersion may be carried out at room temperature or at temperatures up to 100° C. with a temperature of 85° C. being commonly employed.

After immersion, the excess adhesive is removed from the filamentary material by passing it between squeeze rolls or preferably by subjecting the fibrous material to the action of beater bars which shake the excess adhesive therefrom. The treated filamentary material is thereafter thoroughly dried in air, preferably in an air oven, to remove the moisture therefrom and to harden the coating. The drying operation is preferably carried out at 150°–300° F. to prevent possible deleterious effect on the filamentary material, although temperatures as high as 400° F. may be used in some cases.

Cord, etc. may be dried either in a relaxed condition or under slight tension in the case of synthetic fiber such as rayon in accordance with well-known practices.

The treated filamentary material is then incorporated into a rubbery composition by any of the conventional methods for associating fibrous material and rubber material, one of the preferred methods, in the case of cord, fabric and like, being to calender a thin layer of the rubber composition on one or both sides of the cord or fabric. The rubber coating protects the adhesive layer and the coated filamentary material may be stored until used without danger of contamination which would reduce the strength of the adhesive bond. This material is thereafter used for building various rubber articles such as tires, belts, etc., which, after assembly, are vulcanized by means of heat and pressure in accordance with well-known rubber processing techniques.

The improvement in adhesion obtained by use of an adhesive composition in accordance with this invention is best illustrated by means of a few specific examples. It is to be understood that the examples are merely illustrative and it is not intended that the scope of the invention be limited thereby.

Example I

A tire is built by treating tire cord with an adhesive composition prepared in accordance with this invention, calendering rubber on the treated cord to form cord-reinforced plies, assembling the plies and tread, and thereafter vulcanizing the assembly in a mold.

In preparing a preferred adhesive composition, a resorcinol-formaldehyde resin is made by dissolving 59 g. of resorcinol, 40 cc. of formalin (37% by weight formaldehyde) and 0.4 g. of oxalic acid in 70 cc. of acetone. This mixture is refluxed on a steam bath for 30 minutes whereby a sirupy solution containing about 50% by weight of resin having an essentially linear molecular structure is obtained.

A 7 g. portion of this resin solution is dissolved in 5 cc. of aqueous ammonium hydroxide (28% by weight of ammonia) and the mixture is diluted with 23 cc. of water. The resulting diluted solution is then mixed with 48 g. of latex (29.2% by weight of 75:25 butadienestyrene copolymer) and 4 g. of formalin are added thereto to convert the acid-catalyzed resin to a cross-linked structure. The composition preferably is allowed to stand for one hour after addition of the formalin to the basic solution to ensure conversion of the resin.

Nylon cord is immersed in this adhesive composition for five seconds, the excess adhesive is removed from the cord, the cord is dried, and the dried cord is incorporated into a crude rubber tire carcass composition of conventional formulation. The resulting assembly is vulcanized at 280° F. for 45 minutes and the cord-to-rubber adhesion is determined by measuring the force necessary to pull a single cord free from the rubber under compression in accordance with the test method as set forth by Lessig and Compton (Rubber Chemistry and Technology, 19, 223, January 1946).

The adhesion value thus obtained is 433 pounds as compared to 356 pounds for a conventional adhesive composition using an initially base catalyzed condensation resin.

Example II

A 3.5 g. portion of acid catalyzed resin of linear molecular structure prepared as in Example I is mixed with 48 g. of 75:25 butadiene-styrene copolymer latex prepared by polymerizing the monomers to a tough highly-gelled copolymer in the presence of a composite emulsifier comprising 2% to 10% by weight based on said monomers of a synthetic saponaceous material such as the sulfonated reaction product of naphthalene with an aldehyde and not more than 5% by weight based on said monomers of a fatty acid soap and in the presence of only 0.01% to 0.20% of a sulfur-containing modifier such as tertiary dodecyl mercaptan, until 65 to 70% conversion is obtained. The resin is converted by adding 2 cc. of formalin to the resin-latex mixture. In this case, the adhesion of nylon cord to rubber is 639 pounds as compared to 415 pounds for an adhesive composition including a conventional initially base catalyzed resin.

Example III

Nylon cord is treated with an adhesive composition prepared by admixing 7.0 parts by weight of acid catalyzed resorcinol formaldehyde resin solution (50% by weight solution of resin in acetone) prepared as in Example 1, 5.0 parts by weight of 28% ammonium hydroxide, and 13 parts by weight of 10:25:65 2-vinyl pyridine-styrene-butadiene interpolymer in the form of a latex (37% rubber solids) and adding to this mixture 2 parts by weight of 37% formalin.

The adhesion of treated nylon cord to rubber after vulcanization is 839 pounds as compared to 669 pounds for an initially base catalyzed resin composition.

*Example IV*

The adhesive composition employed may be prepared as follows. The phenol-aldehyde resin is prepared by dissolving equimolar proportions of resorcinol with formaldehyde in acetone using 0.8% by weight of oxalic acid based on the weight of the phenol as catalyst, and refluxing the mixture for 30 minutes.

The resulting sirupy resin solution containing about 50% by weight resin is dissolved in two-thirds its weight of a 1.5% by weight aqueous solution of sodium hydroxide and the resulting mixture is diluted with water until the sodium hydroxide concentration is 0.35%.

To 26 parts by weight of this solution is added 48 parts by weight of 75:25 butadiene-styrene latex (27.1% rubber solids), 5 parts by weight of ammonium hydroxide (28% by weight aqueous solution) and 3 parts by weight of formalin (40% by weight formaldehyde).

Viscous rayon cord is treated with this composition and incorporated into a butadiene-styrene copolymer composition. After vulcanization, the adhesion value is 438 pounds as compared to 300 pounds for an initially base catalyzed resin-latex adhesive.

Similarly improved adhesion is obtained using any adhesive composition including a phenol-aldehyde resin prepared in accordance with this invention in combination with other latices, etc. for adhering any fibrous material to any of the commonly employed rubbery compositions within the spirit and scope of the invention as defined in the appended claims.

I claim:

1. In the method of adhering a fibrous material to a rubber material comprising vulcanizing said rubber material in contact with dried adhesive-treated fibrous material, the step which comprises treating the fibrous material, prior to bringing it into adhering relation with the rubber material, with an adhesive composition comprising an aqueous dispersion of a vulcanizable rubber and a fusible curable resin dissolved in a water-miscible volatile organic solvent therefor, said resin being prepared by condensing substantially equimolar proportions of a phenol with an aldehyde in the presence of from 0.05 to 5%, by weight of said phenol, of an acid catalyst and from 30 to 150 percent by weight, based on the combined weight of the aldehyde and phenolic reactants, of said solvent to yield a resin, dissolving said resin in an aqueous solution of base, and thereafter adding to said resin a material furnishing free methylene groups and further condensing said acid catalyzed resin in the presence of said base to produce a resin having an aldehyde-phenol ratio greater than 1 to 1, the amount of material furnishing free methylene groups added being up to 10% by weight of said adhesive composition.

2. In the method of adhering a fibrous material to a rubber material comprising vulcanizing said rubber material in contact with dried adhesive-coated fibrous material, the step which comprises treating the fibrous material, prior to bringing it into adhering relation with the rubber material, with an adhesive composition comprising a rubber latex and a fusible curable resin prepared by condensing substantially equimolar proportions of a polyhydric phenol with an aliphatic aldehyde in from 30 to 150 percent by weight, based on the combined weight of the aldehyde and phenolic reactants, of a water-miscible volatile organic solvent in the presence of from 0.05 to 5%, by weight of said phenol, of an ionizable acid catalyst to yield a resin and thereafter dissolving said resin in aqueous ammonium hydroxide and further condensing it with formaldehyde to produce a resin having an aldehyde-phenol ratio greater than 1 to 1, the amount of additional formaldehyde being up to 10% by weight of said adhesive composition.

3. In the method of adhering a fibrous material to a rubber material comprising vulcanizing said rubber material in contact with dried adhesive-coated fibrous material, the step which comprises treating the fibrous material, prior to bringing it into adhering relation with the rubber material, with an adhesive composition comprising a rubber latex and a fusible curable resin prepared by condensing 1 mole of resorcinol with 1 mole of formaldehyde in the presence of from 0.05 to 5%, by weight of said phenol, of an ionizable acid catalyst and from 30 to 150 percent by weight, based on the combined weight of the aldehyde and phenolic reactants, of a water-miscible volatile organic solvent to yield a resin, dissolving said resin in ammonium hydroxide and adding formaldehyde thereto to condense said resin further to produce a resin having an aldehyde-phenol ratio greater than 1 to 1, the amount of additional aldehyde added being from 1 to 5% by weight of said adhesive composition.

4. In the method of making a composite product by incorporating textile cord in a vulcanizable rubber material and then vulcanizing the rubber material, the step which comprises treating said cord, prior to incorporating said cord in said rubber material, with an adhesive composition comprising an aqueous dispersion of rubbery butadiene-styrene copolymer and a solution of fusible curable resin in a water-miscible volatile organic solvent, said resin being the condensation product prepared by condensing 1 mole of resorcinol with from 0.7 to 1.0 mole of formaldehyde in the presence of from 0.05 to 5%, by weight of said phenol, of an ionizable acid catalyst and from 30 to 150 percent by weight, based on the combined weight of the aldehyde and phenolic reactants, of said solvent to yield a resin, and thereafter dissolving said resin in ammonium hydroxide and adding formaldehyde thereto to condense said acid catalyzed resin further, to produce a resin having an aldehyde-phenol ratio greater than 1 to 1, the amount of addtional aldehyde being from 1 to 5% by weight of said adhesive composition, said resin being present in said composition in an amount of 10% to 50% of the weight of said copolymer, and drying said treated cord.

5. In the method of making a composite product by incorporating textile cord in a vulcanizable rubber material and then vulcanizing the rubber material, the step which comprises treating the cord, prior to incorporating it in said rubber material, with an adhesive composition comprising an aqueous dispersion of a rubbery vinyl pyridine polymer and a fusible curable resorcinol formaldehyde resin in solution in a water-miscible volatile organic solvent, said resin being the condensation product prepared by condensing 1 mole of resorcinol with 1 mole of formaldehyde in the presence of from 0.05 to 5%, by weight of said phenol, of an ionizable acid catalyst and from 30 to 150 per cent by weight, based on the combined weight of the aldehyde and phenolic reactants, of said solvent to yield a resin, and thereafter dissolving said resin in ammonium hydroxide and adding formaldehyde thereto to condense said resin further, to produce a resin having an aldehyde-phenol ratio greater than 1 to 1, the amount of additional aldehyde added being from 1 to 5% by weight of said adhesive composition, said resin being present in said composition in an amount of 10% to 50% of the weight of said rubbery polymer and drying said treated cord.

6. A composite structure comprising a fibrous material and a vulcanized rubber material in adhering relation, said fibrous material having a surface coating of heat-hardened adhesive composition coated on said fibrous material as an adhesive composition comprising a vulcanizable rubber latex and a fusible curable condensation resin prepared by condensing substantially equimolar proportions of a phenol with an aldehyde in from 30 to 150 per cent by weight, based on the combined weight of the aldehyde and phenolic reactants, of a water-miscible volatile organic solvent in the presence of from 0.05 to 5%, by weight of said phenol, of an ionizable acid catalyst to yield a resin, which resin is thereafter dissolved in aqueous solution of a base and further condensed with a material furnishing free methylene groups to produce a resin having an aldehyde-phenol ratio greater than 1 to 1, the amount of material added furnishing free methylene groups being up to 10% by weight of said adhesive composition.

7. A composite structure comprising textile cord and vulcanized rubber material adhered together, said cord having a surface coating of heat-hardened adhesive composition coated on said cord prior to bringing the cord and rubber material into adhering relation as a composition comprising a vulcanizable rubber latex and a solution in a water-miscible volatile organic solvent of a fusible curable resin prepared by condensing substantially equimolar proportions of resorcinol and formaldehyde in the presence of from 0.05 to 5%, by weight of said phenol, of an ionizable acid catalyst and from 30 to 150 percent by weight, based on the combined weight of the aldehyde and phenolic reactants, of said solvent to yield a resin, which resin is thereafter dissolved in aqueous ammonium hydroxide and further condensed by the addition of formaldehyde to produce a resin having an aldehyde-phenol ratio greater than 1 to 1, the amount of additional aldehyde added being from 1 to 5% by weight of said adhesive composition, the resin in said adhesive composition amounting to from 10% to 50% of the weight of rubber in said composition.

8. An adhesive composition comprising an aqueous dispersion of a rubbery conjugated diene polymer, a resin prepared by condensing 1 mole of a phenol with from 0.7 to 1.0 mole of an aldehyde in the presence of from 0.05 to 5%, by weight of said phenol, of an acid catalyst and from 30 to 150 percent by weight, based on the combined weight of the aldehyde and phenolic reactants, of a water-miscible volatile organic solvent followed by further condensation with a material furnishing free methylene groups in the presence of an aqueous solution of a base to produce a resin having an aldehyde-phenol ratio greater than 1 to 1, the amount of material added furnishing free methylene groups being up to 10% by weight of said adhesive composition, and a base, the resin:polymer ratio in said composition being from 1:6 to 1:2 by weight.

9. An adhesive composition comprising an aqueous dispersion of a rubbery conjugated diene polymer, a resin prepared by condensing one mole of a polyhydric phenol with from 0.7 to 1.0 mole of an aldehyde in the presence of from 0.05 to 5%, by weight of said phenol, of an acid catalyst and from 30 to 150 percent by weight, based on the combined weight of the aldehyde and phenolic reactants, of a water-miscible volatile organic solvent followed by further condensation with additional aldehyde in the presence of an aqueous solution of a base to produce a resin having an aldehyde-phenol ratio greater than 1 to 1, the amount of additional aldehyde being from 1 to 5% by weight of said adhesive composition, and a base, the resin:polymer ratio in said composition being from 1:6 to 1:2 by weight.

10. An adhesive composition comprising an aqueous dispersion of a rubbery conjugated diene polymer, a resin prepared by condensing 1 mole of a resorcinol with from 0.7 to 1.0 mole of a formaldehyde in the presence of from 0.05 to 5%, by weight of said phenol, of an acid catalyst and from 30 to 150 percent by weight, based on the combined weight of the aldehyde and phenolic reactants, of a water-miscible volatile organic solvent followed by further condensation with additional formaldehyde in the presence of an aqueous solution of a base to produce a resin having an aldehyde-phenol ratio greater than 1 to 1, the amount of additional aldehyde added being from 1 to 5% by weight of the adhesive composition, and a base, the resin:polymer ratio in said composition being from 1:6 to 1:2 by weight.

11. The adhesive composition of claim 10 in which said rubbery polymer is a rubbery interpolymer of 2-vinyl pyridine, styrene, and butadiene-1,3.

12. The method of making an adhesive composition which comprises condensing 1 mole of a phenol with from 0.7 to 1.0 mole of an aldehyde in the presence of from 0.05 to 5%, by weight of said phenol, of an acid catalyst and from 30 to 150 percent by weight, based on the combined weight of the aldehyde and phenolic reactants, of a water-miscible volatile organic solvent to form a linear resin, mixing said resin with an aqueous solution of a base and with an aqueous dispersion of a rubbery conjugated diene polymer, and adding a material furnishing free methylene groups to said mixture to cause further condensation of said resin to produce a resin having an aldehyde-phenol ratio greater than 1 to 1, the amount of material added furnishing free methylene groups being up to 10% by weight of said adhesive composition, and to produce a composition having a resin:polymer ratio of 1:6 to 1:2 by weight.

13. The method of making an adhesive composition which comprises condensing 1 mole of resorcinol with from 0.7 to 1.0 mole of formaldehyde in the presence of from 0.05 to 5%, by weight of said phenol, of an acid catalyst in from 30 to 150 percent by weight, based on the combined weight of the aldehyde and phenolic reactants, of a water-miscible volatile organic solvent to form a solution of a linear resin, mixing said solution with aqueous ammonia and with an aqueous dispersion of a rubbery conjugated diene polymer, and further condensing said resin with additional formaldehyde to produce a resin having an aldehyde-phenol ratio greater than 1 to 1, the additional amount of aldehyde added being from 1 to 5% by weight of said adhesive composition, and to produce a composition having a resin:polymer ratio of 1:6 to 1:2 by weight.

14. The method of making an adhesive composition which comprises mixing a linear polyhydric phenol-aldehyde resin catalyzed in the presence of from 0.05 to 5%, by weight of said phenol, of an acid catalyst and from 30 to 150 percent by weight, based on the combined weight of the aldehyde and phenolic reactants, of a water-miscible, volatile organic solvent with a base and with an aqueous dispersion of a rubbery conjugated diene polymer and adding aldehyde to said mixture to cause additional condensation of said resin to produce a resin having an aldehyde-phenol ratio greater than 1 to 1, the additional amount of aldehyde added being from 1 to 5% by weight of said adhesive composition, and to produce a composition having a resin:polymer ratio from 1:6 to 1:2 by weight.

15. The method of making an adhesive composition which comprises mixing an acid-catalyzed linear resorcinol-formaldehyde resin prepared in the presence of from 0.05 to 5.0 percent by weight of said phenol of an acid catalyst and from 30 to 150 percent by weight, based on the combined weight of the aldehyde and phenolic reactants, of a water-miscible volatile organic solvent with aqueous ammonia and with an aqueous dispersion of a rubbery conjugated diene polymer, and adding formaldehyde to said mixture to cause additional condensation of said resin to produce a resin having an aldehyde-phenol ratio greater than 1 to 1, the amount of aldehyde added to the adhesive composition being from 1 to 5% by weight of said adhesive composition, and to produce a composition having a resin:polymer ratio from 1:6 to 1:2 by weight.

16. In the method of adhering fibrous synthetic linear superpolyamides to a rubber material comprising vulcanizing said rubber material in contact with dried and hardened adhesive treated fibrous synthetic linear superpolyamides, the step which comprises treating said fibrous synthetic linear superpolyamides prior to bringing the same into adhering relation with the rubber material, with an adhesive composition comprising an aqueous dispersion containing from 5 to 40% by weight of a vulcanizable rubber and from 0.5 to 20% by weight of a fusible curable resin dissolved in a water-miscible volatile organic solvent therefor, the ratio of said resin to said rubber being from 1:6 to 1:2 parts by weight, said resin being prepared by reacting substantially equimolar proportions of a polyhydric phenol with an aldehyde in the presence of from 0.05 to 5% by weight of said phenol, of an acid catalyst and from 30 to 150 percent by weight, based on the combined weight of the aldehyde and phenolic reactants, of a water-miscible volatile organic solvent to yield a resin, dissolving said resin in an aqueous solution of base, and thereafter adding to said resin a material furnishing free methylene groups and further condensing said acid catalyzed resin in the presence of said base to produce a resin having an aldehyde-phenol ratio greater than 1 to 1, the additional amount of material furnishing free methylene groups added to the adhesive composition being up to 10% by weight of said adhesive composition.

17. A composite structure comprising fibrous synthetic linear superpolyamide and vulcanized rubber material adhered together, said polyamide having at least a surface coating of dried, heat-hardened adhesive composition coated thereon prior to bringing said coated polyamide and rubber material into adhering relation, said adhesive composition comprising an aqueous dispersion containing from 5 to 40% by weight of a vulcanizable rubber and from 0.5 to 20% by weight of a fusible curable resin dissolved in a water-miscible volatile organic solvent therefor, the ratio of said resin to said rubber being from 1:6 to 1:2 parts by weight, and said adhesive composition being prepared by condensing substantially equimolar proportions of a polyhydric phenol with an aldehyde in the presence of from 0.05 to 5%, by weight of said phenol, of an acid catalyst and from 30 to 150 percent by weight, based on the combined weight of the aldehyde and phenolic reactants, of a volatile organic water-miscible solvent to yield a resin, dissolving said resin in an aqueous solution of base, adding to said base solution an aqueous dispersion of a vulcanizable rubber, and thereafter adding to said resinous rubber solution a material furnishing free methylene groups and further condensing said acid catalyzed resin in the presence of said base to produce a resin having an aldehyde-phenol ratio greater than 1 to 1, the amount of additional material furnishing free methylene groups added being up to 10% by weight of said adhesive composition.

18. In the method of making a composite product by incorporating a textile cord of synthetic linear superpolyamides in a mass of vulcanizable rubber material and then vulcanizing the rubber-cord material, the steps which comprise treating said textile cord formed of synthetic linear superpolyamides prior to incorporating said cord in said material with an adhesive composition comprising from 8 to 20% by weight of a vulcanizable rubber and from 0.8 to 10% by weight of a fusible-curable resin, the ratio of said resin to said rubber being from 1:6 to 1:2 parts by weight, said adhesive composition being prepared by condensing substantially equimolar proportions of a polyhydric phenol and an aldehyde in from 30 to 150 percent by weight, based on the combined weight of the aldehyde and phenolic reactants, of a water-miscible volatile organic solvent in the presence of from 0.05 to 5.0% by weight of said phenol of an ionizable acid catalyst to yield a resin, dissolving said resin in an aqueous solution of a base, adding thereto a latex of a vulcanizable rubber, and adding additional aldehyde in an amount sufficient to produce on final condensation a resin having an aldehyde-phenol ratio greater than 1 to 1, the amount of additional aldehyde being from 1 to 5% by weight of said adhesive composition, removing the excess adhesive from said treated cord, and finally drying said adhesive treated textile cord prior to incorporating the same into said mass of rubber material.

19. An adhesive composition for binding a synthetic linear superpolyamide to a vulcanizable rubber material comprising an aqueous dispersion of a rubbery conjugated diene polymer and a phenol-aldehyde resin prepared by condensing one mole of a phenol with from 0.7 to 1.0 mole of an aldehyde in the presence of from 0.05 to 5%, by weight of said phenol, of an acid catalyst and from 30 to 150 percent by weight, based on the combined weight of the aldehyde and phenolic reactants, of a water-miscible volatile organic solvent, dissolving said condensate in basic medium, adding thereto a vulcanizable rubbery dispersion containing from 8 to 20% by weight of a vulcanizable rubber, and finally incorporating with the resulting solution additional aldehyde in basic medium to produce a cross-linked resin having a total aldehyde and phenol content of from 0.8 to 10% by weight and an aldehyde to phenol ratio greater than 1 to 1, the amount of additional aldehyde being from 1 to 5% by weight of said adhesive composition, the adhesive composition having a resin to polymer ratio of 1:6 to 1:2 by weight.

20. A method of making an adhesive composition for binding a synthetic linear superpolyamide to a vulcanizable rubber material which comprises condensing one mole of a phenol with from 0.7 to 1.0 mole of an aldehyde in the presence of from 0.05 to 5%, by weight of said phenol, of an acid catalyst and from 30 to 150 percent by weight, based on the combined weight of the aldehyde and phenolic reactants, of a water-miscible organic volatile solvent to form a linear condensed resin, dissolving said resin in basic medium, mixing with said basic medium an aqueous dispersion containing a vulcanizable rubbery conjugated diene polymer in an amount of from 8 to 20% by weight, and adding aldehyde in basic medium to said mixture to cause cross-linkage condensation of said resin and produce a resin having a total aldehyde and phenol content of from 0.8 to 10% by weight and an aldehyde to phenol ratio greater than 1 to 1, the amount of additional aldehyde being from 1 to 5% by weight of said adhesive composition, the adhesive composition having a resin to polymer ratio of 1:6 to 1:2 by weight.

References Cited in the file of this patent

UNITED STATES PATENTS

| Number | Name | Date |
| --- | --- | --- |
| 2,429,397 | Compton et al. | Oct. 21, 1947 |
| 2,481,879 | Ross | Sept. 13, 1949 |